US007779324B2

United States Patent
Lee

(10) Patent No.: US 7,779,324 B2
(45) Date of Patent: Aug. 17, 2010

(54) METHOD AND SYSTEM FOR DETECTING WIRED NETWORK ERROR IN MOBILE COMMUNICATION TERMINAL

(75) Inventor: Jeong-Hoon Lee, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 1070 days.

(21) Appl. No.: 11/485,809

(22) Filed: Jul. 12, 2006

(65) Prior Publication Data

US 2007/0061662 A1 Mar. 15, 2007

(30) Foreign Application Priority Data

Aug. 11, 2005 (KR) ........................ 10-2005-0073894

(51) Int. Cl.
*G06F 11/30* (2006.01)
*G08C 25/00* (2006.01)
*H03M 13/00* (2006.01)

(52) U.S. Cl. ...................................... 714/746; 370/389

(58) Field of Classification Search ................. 714/746; 370/389
See application file for complete search history.

(56) References Cited

U.S. PATENT DOCUMENTS

2002/0071432 A1* 6/2002 Soderberg et al. ............ 370/389
2005/0265353 A1* 12/2005 Sengupta et al. ........ 370/395.52

* cited by examiner

*Primary Examiner*—Guy J Lamarre
(74) *Attorney, Agent, or Firm*—H.C. Park & Associates, PLC

(57) ABSTRACT

Disclosed is a method and system for detecting wired network errors in a mobile communication terminal, which performs a selective checksum operation for received data in a UDP (User Datagram Protocol) layer to improve the processing speed of the mobile communication terminal. In the system, it is determined whether to perform the checksum operation in the UDP layer by a UDP checksum setup value that is changed to a first setup value when an IP (Internet Protocol) header checksum error occurs in an IP layer. In this case, the UDP checksum setup value is changed to a second setup value when the UDP checksum operation is performed.

9 Claims, 3 Drawing Sheets

METHOD AND SYSTEM FOR DETECTING WIRED NETWORK ERROR IN MOBILE COMMUNICATION TERMINAL

BACKGROUND OF THE INVENTION

This application claims the priority of Korean Patent Application No. 2005-73894, filed on Aug. 11, 2005, in the Korean Intellectual Property Office, the disclosure of which is incorporated herein in its entirety by reference.

FIELD OF THE INVENTION

The present invention relates to a method and system for detecting wired network errors in a mobile communication terminal and, more particularly, to a technology of detecting wired network errors in real-time transmitted audio/video data.

DESCRIPTION OF RELATED ART

Audio/video data transmitted in real-time to a mobile communication terminal may be disconnected mainly due to errors occurring in a wireless network. The errors are detected in Radio Link Protocol (RLP) and Point-to-Point Protocol (PPP), which belong to a data link layer.

On the other hand, the probability of error occurrence in the wired network is very low compared to that of error occurrence in the wireless network. Accordingly, the present applicant has studied on a technology of improving the processing speed of the mobile communication terminal by minimizing the amount of error checking undertaken in a network layer and a transport layer, which is performed to detect errors in the wired network.

SUMMARY OF THE INVENTION

The present invention provides a method and system for detecting wired network errors in a mobile communication terminal, which is capable of minimizing the amount of error checking undertaken in the mobile communication terminal by performing a selective checksum operation for received data in a UDP layer.

According to an aspect of the present invention, there is provided a system for detecting wired network errors in a mobile communication terminal, which performs a selective checksum operation for received data in a UDP (User Datagram Protocol) layer to improve the processing speed of the mobile communication terminal.

It may be determined whether to perform the checksum operation in the UDP layer by a UDP checksum setup value that is changed to a first setup value when an IP (Internet Protocol) header checksum error occurs in an IP layer.

The UDP checksum setup value may be changed to a second setup value when the UDP checksum operation is performed.

The system may include: an IP layer error detection unit which performs a checksum operation for an IP header of the received data to check whether or not an IP header checksum error has occurred; a UDP checksum setup value processing unit which discards IP data and changes a UDP checksum setup value to a first setup value when the IP header checksum error is determined to have occurred by the IP layer error detection unit, and checks the UDP checksum setup value when the IP header checksum error is not determined to have occurred; and a UDP layer error detection unit which performs the UDP checksum operation when the UDP checksum setup value is equal to the first setup value, and changes the UDP checksum setup value to a second setup value.

The system may further include: a RTP (Real-time Transport Protocol) layer error detection unit which checks whether or not RTP header error has occurred when the UDP checksum setup value is not equal to the first setup value as a result of checking the UDP checksum setup value by the UDP checksum setup value processing unit; and a RTP data processing unit which discards RTP data and changes the UDP checksum setup value to the first setup value when the RTP header error is determined to have occurred by the RTP layer error detection unit, and transfers the RTP data to an application layer when the RTP header error is not determined to have occurred.

The UDP layer error detection unit may discard UDP data when UDP header error has occurred, and transfer the RTP data to the application layer when the UDP header error has not occurred.

The RTP layer error detection unit may check only a field that has an unchanged or limited value in a RTP header to detect the RTP header error, thereby minimizing the amount of error checking.

The RTP header detected by the RTP layer error detection unit may be a version field that has an unchanged value or a PT (payload type) field that has a limited value.

According to another aspect of the present invention, there is provided a method of detecting wired network errors in a mobile communication terminal, the method including the operations of: performing a checksum operation for an IP header of received data to check whether or not an IP header checksum error has occurred; discarding IP data and changing a UDP checksum setup value to a first setup value when the IP header checksum error is determined to have occurred, and checking the UDP checksum setup value when the IP header checksum error is not determined to have occurred; and performing a UDP checksum operation when the UDP checksum setup value is equal to the first setup value as a result of checking the UDP checksum setup value, and changing the UDP checksum setup value to a second setup value.

The method may further include: checking whether or not RTP header error has occurred when the UDP checksum setup value is not equal to the first setup value as a result of checking the UDP checksum setup value; and discarding RTP data and changing the UDP checksum setup value to the first setup value when the RTP header error is determined to have occurred, and transferring the RTP data to an application layer when the RTP header error is not determined to have occurred.

In the operation of performing a UDP checksum operation, UDP data may be discarded when UDP header error has occurred, and the RTP data may be transferred to the application layer when the UDP header error has not occurred.

In the operation of checking whether or not RTP header error has occurred, only a field that has an unchanged or limited value in a RTP header may be checked to detect the RTP header error, thereby minimizing the amount of error checking.

The RTP header detected in the operation of checking whether or not RTP header error has occurred may be a version field that has an unchanged value, or a PT (payload type) field that has a limited value.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
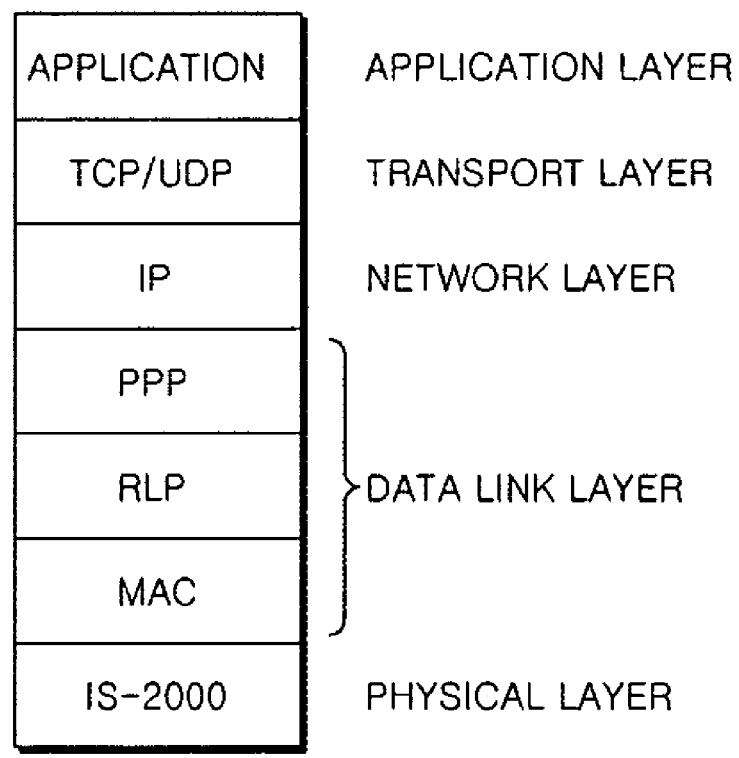
FIG. 1 is an OSI hierarchical structure of a mobile communication terminal.

FIG. 1 is an OSI hierarchical structure of a mobile communication terminal.

The mobile communication terminal includes a physical layer, a data link layer, a network layer, a transport layer, and an application layer.

The physical layer provides the hardware means of sending and receiving data on a carrier and performs establishment and termination of a connection to a communications medium.

The data link layer provides synchronization for the physical level and furnishes transmission protocol knowledge and management. The data link layer includes a Media Access Control (MAC) sublayer, which determines who is allowed to access mediums at any one time, a RLP sublayer, which acts to increase link reliability by means of retransmissions in the expense of additional delays, and a PPP sublayer, which is a protocol for communication between two computers using a serial interface, typically a personal computer connected by phone line to a server.

The network link layer provides the functional and procedural means of transferring variable length data sequences from a source to a destination via one or more networks while maintaining the quality of service requested by the transport layer. It also determines the route from the source to the destination computer and manages traffic problems, such as switching, routing, and controlling the congestion of data packets.

The transport layer provides transparent transfer of data between hosts, and is usually responsible for end-to-end error recovery and flow control, and ensuring complete data transfer. It includes a Transmission Control Protocol (TCP) sublayer, which is a set of rules used along with the Internet Protocol (IP) to send data in the form of message units between computers over the Internet and takes care of keeping track of the individual units of data that a message is divided into for efficient routing through the Internet, and a User Datagram Protocol (UDP) sublayer, which is a communications protocol that offers a limited amount of service when messages are exchanged between computers in a network that uses the IP.

The application layer interfaces directly to and performs common application services for the application processes, which provide semantic conversion between associated application processes.

Figure 2:
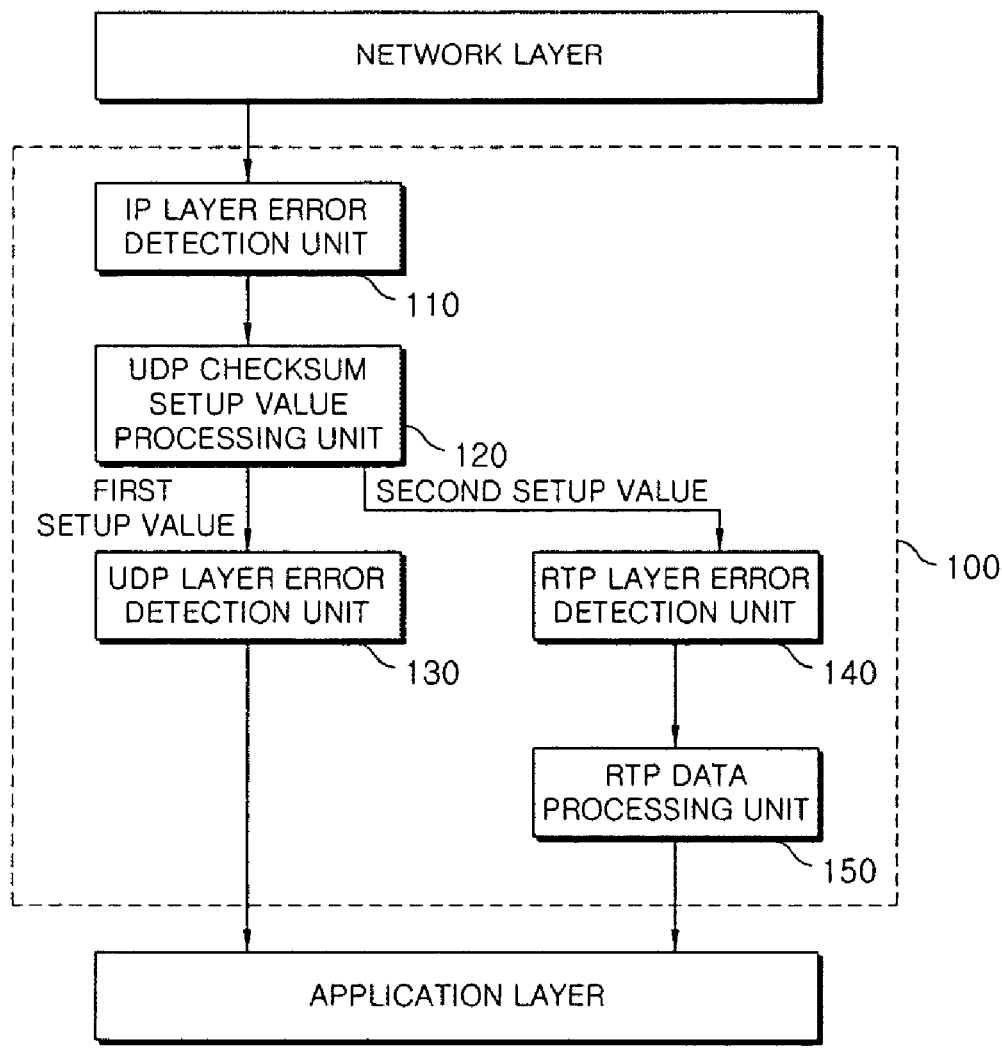
FIG. 2 is a block diagram of a system for detecting wired network errors in a mobile communication terminal according to an embodiment of the present invention.

FIG. 2 is a block diagram of a system for detecting wired network errors in a mobile communication terminal according to an embodiment of the present invention.

The system for detecting wired network errors in a mobile communication terminal exists in software which is run in the mobile communication terminal, and performs a selective checksum operation on received data in a UDP layer to improve the processing speed of the mobile communication terminal.

The checksum operation in the UDP layer is performed according to a UDP checksum setup value, which changes to a first setup value when an IP header checksum error occurs in the IP layer. The UDP checksum setup value changes to a second setup value upon performing the UDP checksum operation.

The system 100 for detecting wired network errors in the mobile communication terminal includes an IP layer error detection unit 110, a UDP checksum setup value processing unit 120, and a UDP layer error detection unit 130.

The IP layer error detection unit 110 performs a checksum operation for an IP header of received data to check whether or not an IP header checksum error has occurred.

If wireless network errors are not detected in the RLP layer and the PPP layer, which belong to the data link layer shown in FIG. 1, a process for detecting wired network errors is performed in the network layer and the transport layer. A technology of detecting the wireless network errors in the RLP layer and the PPP layer is well known in the art and a detailed description thereof will thus be omitted herein.

Conventionally, there is a problem in that the processing speed of the mobile communication terminal decreases since an unconditional checksum operation for received data is performed in the UDP layer. Accordingly, in the present invention, a selective checksum operation for received data is performed in the UDP layer to improve the processing speed of the mobile communication terminal.

For this purpose, the system 100 for detecting the wired network errors in the mobile communication terminal performs a checksum operation on an IP header of received data by means of the IP layer error detection unit 110 to check whether or not an IP header checksum error occurs.

When the IP header checksum error is determined to have occurred by the IP layer error detection unit 110, the UDP checksum setup value processing unit 120 discards the IP data and changes the UDP checksum setup value to a first setup value. When the IP header checksum error is not determined to have occurred by the IP layer error detection unit 110, the UDP checksum setup value processing unit 120 checks the UDP checksum setup value.

In the present invention, it is determined whether to perform a checksum operation in the UDP layer by the UDP checksum setup value. When the UDP checksum setup value is a first setup value, the checksum operation is performed in the UDP layer. When the UDP checksum setup value is a second setup value, the checksum operation is not performed in the UDP layer.

When the IP header checksum error is determined to have occurred by the IP layer error detection unit 110, the UDP checksum setup value processing unit 120 of the system 100 according to an embodiment of the present invention discards IP data, and changes the UDP checksum setup value to the first setup value to perform the checksum operation on subsequently received data in the UDP layer.

When the IP header checksum error is not determined to have occurred by the IP layer error detection unit 110, the UDP checksum setup value is checked.

When the UDP checksum setup value is the first setup value, the UPD layer error detection unit 130 performs the UPD checksum operation and changes the UDP checksum setup value to the second setup value.

That is, when the IP header checksum error is not determined to have occurred by the IP layer error detection unit 110 and the UDP checksum setup value is the first setup value, the wired network error detection system 100 of the mobile communication terminal performs the UDP checksum operation by means of the UDP layer error detection unit 130, and changes the UDP checksum setup value to the second setup value such that it does not perform the checksum operation for subsequently received data in the UDP layer.

Accordingly, the wired network error detection system 100 of the mobile communication terminal performs error checking for the RTP data in the wired network by performing the IP header checksum operation and the RTP (Real-time Transport Protocol) header error check, and performs the UDP checksum operation for subsequently transferred RTP data only when the IP header checksum error occurs. Accordingly, it is possible to reduce the amount of error checking undertaken in the mobile communication terminal by performing a selective checksum operation for received data in the UDP layer. As a result, it is possible to improve the processing speed of the mobile communication terminal.

The above-mentioned selective UDP checksum operation can be performed since the size of the UDP header is much smaller than that of the IP header or the RTP header (the IP header being typically 20 byte long, RTP header being 12 byte long, and UDP header being 8 byte long) and the probability of error occurrence in the UDP header is very low.

The wired network error detection system 100 may further include a RTP layer error detection unit 140 and a RTP data processing unit 150.

When the UDP checksum setup value is not determined to be the first setup value by the UDP checksum setup value processing unit 120, the RTP layer error detection unit 140 checks whether or not the RTP header error has occurred.

When the RTP header error is determined to have occurred by the RTP layer error detection unit 140, the RTP data processing unit 150 discards the RTP data and changes the UDP checksum setup value to the first setup value. When the RTP header error is not determined to have occurred by the RTP layer error detection unit 140, the RTP data processing unit 150 transfers the RTP data to the application layer.

That is, the present embodiment describes a process performed when the UDP checksum setup value is set to the second setup value. When an error is not detected as a result of the IP header checksum and the UDP checksum setup value is the second setup value, the wired network error detection system 100 checks by means of the RTP layer error detection unit 140 whether or not the RTP header error has occurred. When the RTP header error is determined to have occurred by the RTP layer error detection unit 140, the system 100 discards the RTP data and changes the UDP checksum setup value to the first setup value by means of the RTP data processing unit 150 to perform the checksum operation for the subsequently received data in the UDP layer.

When the RTP header error is not determined to have occurred by the RTP layer error detection unit 140, the wired network error detection system 100 transfers the RTP data to the application layer through the RTP data processing unit 150.

Accordingly, the wired network error detection system 100 of the mobile communication terminal performs error checking for the RTP data in the wired network by performing the IP header checksum operation and the RTP header error check, and performs the UDP checksum operation for subsequently transferred RTP data only when the IP header checksum error occurs. Accordingly, it is possible to reduce the amount of error checking undertaken in the mobile communication terminal by performing a selective checksum operation for received data in the UDP layer. As a result, it is possible to improve the processing speed of the mobile communication terminal.

On the other hand, when the UDP header error has occurred, the UDP layer error detection unit 130 discards the UDP data. When the UDP header error has not occurred, it transfers the RTP data to the application layer.

That is, according to the present embodiment, when the UDP header error is determined to have occurred as a result of the selective UDP header checksum, the wired network error detection system 100 discards the UDP data through the UDP layer error detection unit 130. In addition, when the UDP header error is not determined to have occurred, the wired network error detection system 100 transfers the RTP data to the application layer.

On the other hand, the RTP layer error detection unit 140 may check fields that have unchanged or limited values in the RTP header to detect the RTP header error.

The RTP header field detected by the RTP layer error detection unit may be a version field which has an unchanged value, a payload type (PT) field which has a limited value, or both of them.

Figure 3:
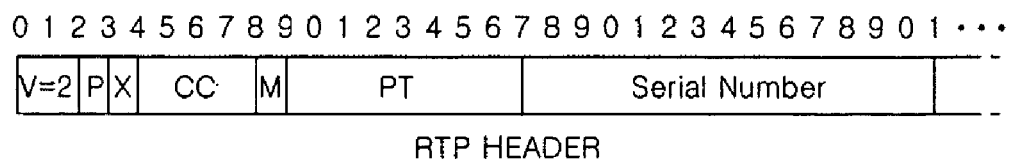
FIG. 3 is a configuration of a RTP header.

FIG. 3 is a configuration of the RTP header. In the drawing, V indicates a version, P, padding, X, extension, CC, CSRC count, M, marker, PT, payload type, and SN, serial number.

Among these fields, the version field has an unchanged value, and the payload type field has a limited value.

That is, in the present embodiment, only a field that has an unchanged or limited value in the RTP header is checked upon detecting the RTP header error, thereby improving the processing speed of the mobile communication terminal.

Figure 4:
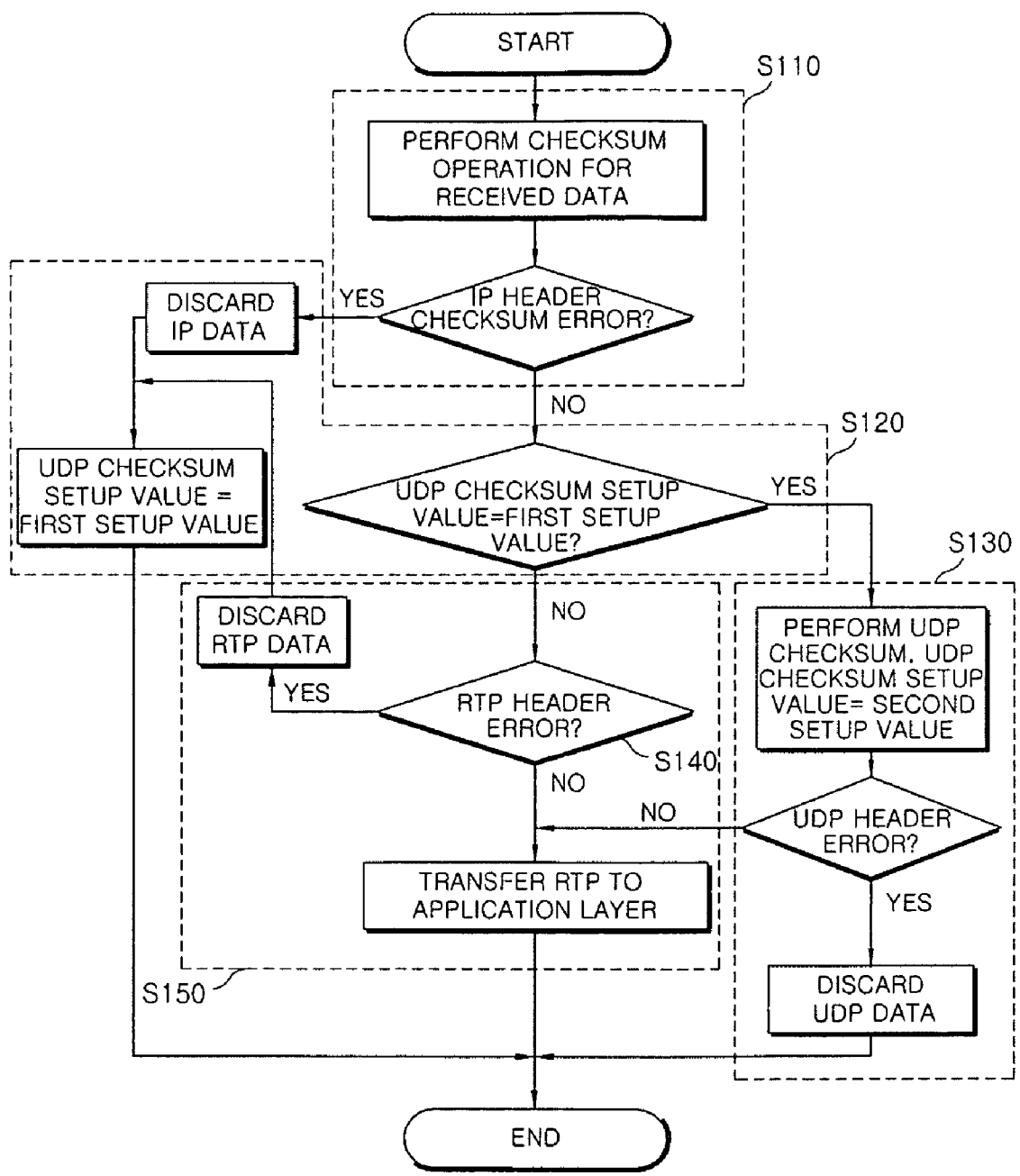
FIG. 4 is a flow chart of a method of detecting wired network errors in a mobile communication terminal according to an embodiment of the present invention.

FIG. 4 is a flow chart of a method of detecting wired network errors in a mobile communication terminal according to an embodiment of the present invention.

In operation S110, the wired network error detection system performs a checksum operation for an IP header of received data, which is subjected to error checking in a wireless network, to check whether or not the IP header checksum error has occurred.

In operation S120, when the IP header checksum error is determined to have occurred, the wired network error detection system discards IP data and changes the UDP checksum setup value to the first setup value. When the IP header checksum error is not determined to have occurred, it checks the UDP checksum setup value.

When the UDP checksum setup value is the first setup value in the operation S120, the wired network error detection system performs the UDP checksum operation and changes the UDP checksum setup value to the second setup value in operation S130.

When the UDP header error has occurred in the operation S130, the wired network error detection system discards the UDP data. When the UDP header error has not occurred, the wired network error detection system transfers the RTP data to the application layer.

When the UDP checksum setup value is not the first setup value in the operation S120, the wired network error detection system checks in operation S140 whether or not the RTP header error has occurred.

When the RTP header error is determined to have occurred in the operation S140, the wired network error detection system discards the RTP data and changes the UDP checksum setup value to the first setup value. When the RTP header error is not determined to have occurred, the wired network error detection system transfers the RTP data to the application layer.

On the other hand, in the operation S140, it is preferred to check only a field that has an unchanged or limited value in the RTP header upon detecting the RTP header error, thereby minimizing the amount of error checking undertaken in the mobile communication terminal. The RTP header field detected in the operation S140 may be a version field which has an unchanged value, a payload type field which has a limited value, or both of them.

Accordingly, the present invention performs error checking for the RTP data in the wired network by performing the IP header checksum operation and the RTP header error check, and performs the UDP checksum operation for subsequently transferred RTP data only when the IP header checksum error occurs. Accordingly, it is possible to reduce the amount of error checking undertaken in the mobile communication terminal by performing a selective checksum operation for received data in the UDP layer. As a result, it is possible to improve the processing speed of the mobile communication terminal.

As apparent from the above description, the wired network error detection system according to the present invention performs error checking for the RTP data in the wired network by performing the IP header checksum operation and the RTP header error check, and performs the UDP checksum operation for subsequently transferred RTP data only when the IP header checksum error occurs. Accordingly, it is possible to reduce the amount of error checking undertaken in the mobile communication terminal by performing a selective checksum operation for received data in the UDP layer. As a result, it is possible to improve the processing speed of the mobile communication terminal.

While the present invention has been described with reference to exemplary embodiments thereof, it will be understood by those skilled in the art that various changes in form and details may be made therein without departing from the scope of the present invention as defined by the following claims.

What is claimed is:

1. A method of detecting wired network errors in a mobile communication terminal, the method comprising the operations of:

performing a checksum operation for an Internet Protocol (IP) header of received data to check whether or not an IP header checksum error has occurred;

discarding IP data and changing a User Datagram Protocol (UDP) checksum setup value to a first setup value when the IP header checksum error is determined to have occurred, and checking the UDP checksum setup value when the IP header checksum error is not determined to have occurred; and performing a UDP checksum operation when the UDP checksum setup value is equal to the first setup value as a result of checking the UDP checksum setup value, and changing the UDP checksum setup value to a second setup value.

2. The method of claim 1, further comprising:

checking whether or not a Real-time Transport Protocol (RTP) header error has occurred when the UDP checksum setup value is not equal to the first setup value as a result of checking the UDP checksum setup value; and discarding RTP data and changing the UDP checksum setup value to the first setup value when the RTP header error is determined to have occurred, and transferring the RTP data to an application layer when the RTP header error is not determined to have occurred.

3. The method of claim 2, wherein in the operation of performing a UDP checksum operation, discarding UDP data when UDP header error has occurred, and transferring the RTP data to the application layer when the UDP header error has not occurred.

4. The method of claim 3, wherein in the operation of checking whether or not RTP header error has occurred, checking only a field that has an unchanged or limited value in a RTP header to detect the RTP header error.

5. The method of claim 4, wherein the RTP header detected in the operation of checking whether or not RTP header error has occurred is a version field that has an unchanged value.

6. The method of claim 4, wherein the RTP header detected in the operation of checking whether or not RTP header error has occurred is a payload type (PT) that has a limited value.

7. The method of claim 2, wherein in the operation of checking whether or not RTP header error has occurred, checking only a field that has an unchanged or limited value in a RTP header to detect the RTP header error.

8. The method of claim 7, wherein the RTP header detected in the operation of checking whether or not RTP header error has occurred is a version field that has an unchanged value.

9. The method of claim 7, wherein the RTP header detected in the operation of checking whether or not RTP header error has occurred is a payload type (PT) field that has a limited value.

* * * * *